May 29, 1923.
O. KONIGSLOW, SR
1,456,606
BRAKE BAND FITTING
Filed Aug. 22, 1921
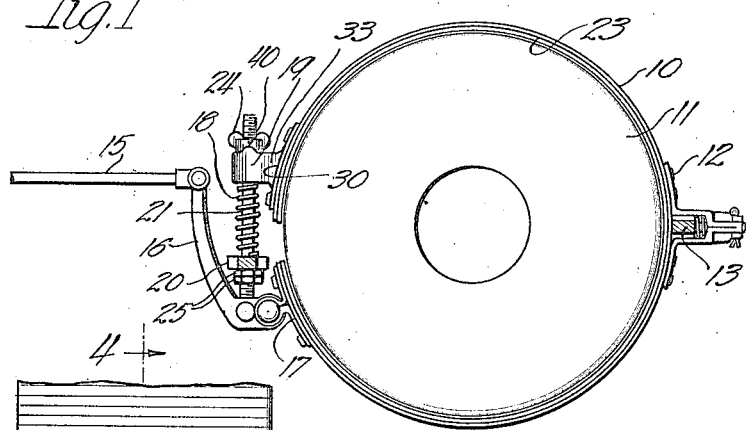
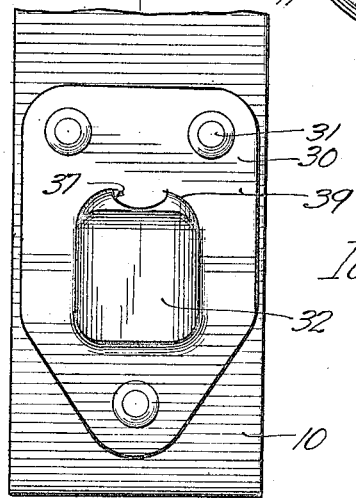
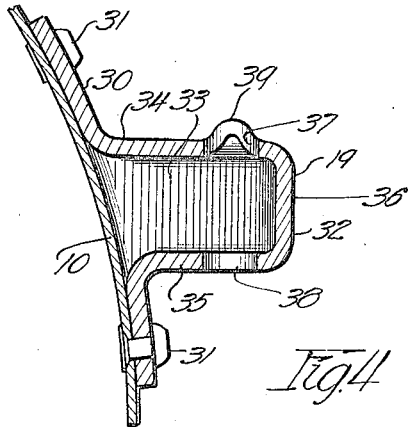
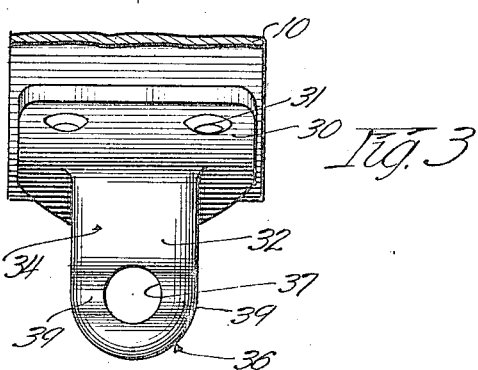
Inventor
Otto Konigslow, Sr.
William, Bradbury,
See, & McCaleb Attys.

Patented May 29, 1923.

1,456,606

UNITED STATES PATENT OFFICE.

OTTO KONIGSLOW, SR., OF CLEVELAND, OHIO, ASSIGNOR TO OTTO KONIGSLOW MANUFACTURING COMPANY, OF CLEVELAND, OHIO, A CORPORATION OF OHIO.

BRAKE-BAND FITTING.

Application filed August 22, 1921. Serial No. 494,344.

*To all whom it may concern:*

Be it known that I, OTTO KONIGSLOW, Sr., a citizen of the United States, and resident of Cleveland, in the county of Cuyahoga and State of Ohio, have invented a certain new and useful Improvement in Brake-Band Fittings, of which the following is a full, clear, concise, and exact description, reference being had to the accompanying drawings forming a part of this specification.

My invention relates to a brake band fitting and more particularly to a fitting comprising a metal stamping adapted to be secured to one end of a brake band and forming part of the means employed to distort the brake band thereby causing it to engage its associated brake drum.

An object of my invention is to provide a fitting of the character described in which the metal is so disposed as to adequately meet the stress imposed upon it during the braking operation.

Another object of my invention is to provide a metal stamping of the character described comprising a plate adapted to be rigidly secured to the brake band and a hollow rectangular protuberance struck from the plate for operatively engaging the certain mechanism by which the brake band is drawn or forced into operative relation with the brake drum, the protuberance comprising a plurality of walls substantially in line with the stress imposed upon the protuberance, the walls being tied together by other walls adapted to prevent crumpling of the protuberance when the stress is imposed upon it.

These and other objects of my invention will be more clearly pointed out as the following description progresses, reference being had to the accompanying drawings, in which Figure 1 is a somewhat diagrammatic view of a brake drum and band, and co-operating mechanism, one end of the band having a fitting secured to it which embodies the novel features of my invention;

Figure 2 is a front elevation of my improved brake band fitting;

Figure 3 is a plan view of the fitting; and

Figure 4 is a section taken on line 4—4 of Figure 2.

Similar characters of reference indicate similar parts throughout the several views.

I have illustrated my improved brake band fitting in connection with a double acting band brake of the external contracting type. The band brake comprises a brake band 10 disposed around the brake drum 11. The brake band 10 is rigidly secured to a bracket 12, in turn adjustably secured to a bar 13, which is immovable relatively to the brake drum 11. The band brake is operated by means of a brake rod 15 which is pivotally secured to one end of a brake band lever 16, the brake band lever 16 having its other end pivotally secured to a bracket 17. The bracket is rigidly secured upon one end of the brake band 10. Pivotally secured to the brake band lever 16, at a point intermediate its ends, is an adjusting rod 18 which operatively engages a brake band fitting 19 rigidly secured to the other end of the brake band 10. The brake band fitting 19 embodies the novel features of my invention, and to point out these features it will be necessary to briefly describe the mechanism with which the fitting co-operates. The adjusting rod 18 is slidably journaled in a bar 20, which is also immovable relatively to the brake drum 11. Disposed around the adjusting rod 18 and interposed between the bar 20 and brake band fitting 19 is a helical compression spring 21 which normally holds the brake band 10 in a position wherein the brake band lining 23 does not contact the friction surface of the brake drum 11. The distance which the spring 18 may force the brake band away from the brake drum is limited by a wing nut 24 and a plurality of lock nuts 25—25, threaded upon the rod 18, The wing nut 24 functions as a stop for the brake band fitting 19, the wing nut being adapted to engage the upper surface of the fitting. The lock nuts 25—25 are disposed directly beneath the bar 20. The details and operation of the described structure are well known to those skilled in the art, and it is readily understood that by means of the brake rod 15 the ends of the brake band 10 may be drawn toward each other, the rod 18 moving in a downward direction. It is apparent that the rod is in tension during this operation, and that this stress is imparted to the brake band fitting 19 by means of the nut 24.

The brake band fitting 19 comprises a plate 30 shaped to conform to the outer cylindrical surface of the brake band 10 and adapted to be secured to the brake band by means of rivets as indicated at 31—31. A hollow rectangular protuberance 32 is struck from the central portion of the plate 30 and projects outwardly relatively to the brake band 10. The hollow rectangular protuberance 32 comprises a plurality of rectangular side walls 33—33 which are tied together by a top wall 34, a bottom wall 35, and an arcuate end wall 36. Apertures 37 and 38 are provided in the top wall 34, and bottom wall 35, respectively. The apertures 37 and 38 are in alignment, and the rod 18 is slidably journaled in them. The top wall 34 is provided with a plurality of outwardly projecting ribs 39—39 which are adapted to enter corresponding grooves 40—40 provided in the lower surface of the wing nut 24. The ribs 39—39 serve to prevent accidental displacement of the wing nut 24 when it has been adjusted to any desired position upon the rod 18.

As hereinbefore stated, the rod 18 is in tension when the band brake is in operation and this stress is imparted to the brake band fitting 19 by means of the nut 24 resting upon the top wall 34 of the fitting. The top wall 34 transmits the stress to the side walls 33—33 which are disposed in planes substantially in line with this stress.

The top wall 34, bottom wall 35, and the arcuate wall 36 prevent distortion of the side walls 33 when the aforesaid stress is imposed upon them, and so prevent the side walls from crumpling or buckling. Such crumpling or buckling of the side walls would, of course, result in a total failure of the device. This structure is therefore advantageous as its permits the fitting to be stamped from a comparatively thin sheet of metal, and yet the disposal of the metal is such as to adequately meet the stress imposed upon the fitting.

While I have described the details of construction of the preferred embodiment of my invention, it is to be clearly understood that I do not limit myself to these details except by the scope of the appended claims.

Having thus described my invention, what I claim as new and desire to secure by Letters Patent of the United States is:

1. A brake band fitting comprising a plate shaped to conform to the cylindrical surface of the brake band, and a hollow rectangular protuberance stamped from the plate, the protuberance comprising a plurality of rectangular walls substantially in line with the strain to which the fitting is to be subjected, and walls for tying the walls together to prevent crumpling of the same when they are subjected to the strain.

2. A brake band fitting comprising an arcuate plate and a hollow rectangular protuberance stamped therefrom, the protuberance comprising a plurality of rectangular walls joined at their outer ends by an arcuate wall integral with said rectangular walls, and tied together by top and bottom walls formed integrally and being continuous with said rectangular and arcuate walls, the top and bottom walls being apertured to receive a rod for operating the braking mechanism, the rectangular walls being substantially in line with the strain imposed upon said rod.

3. The method of making a brake band fitting comprising stamping a hollow rectangular protuberance from a metallic plate and shaping the plate to conform to a cylindrical surface of a brake band, and forming the rectangular protuberance so as to provide a plurality of rectangular walls substantially in line with the strain to which the fitting is to be subjected and to provide other walls for tying the rectangular walls together.

In witness whereof, I hereunto subscribe my name this 9th day of August, 1921.

OTTO KONIGSLOW, Sr.

Witnesses:
CHAS. T. THIE,
ARTHUR G. HENRY.